United States Patent
Sunaga et al.

[11] Patent Number: 5,820,020
[45] Date of Patent: Oct. 13, 1998

[54] AIR-MIXING DOOR OPENING-DEGREE CONTROL DEVICE FOR AN AUTOMOTIVE VEHICLE AIR-CONDITIONING SYSTEM

[75] Inventors: Hideki Sunaga; Masatoshi Suto, both of Tokyo, Japan

[73] Assignee: Calsonic Corporation, Tokyo, Japan

[21] Appl. No.: 881,354

[22] Filed: Jun. 24, 1997

[30] Foreign Application Priority Data

Jun. 24, 1996 [JP] Japan .................................. 8-162544
Jun. 11, 1997 [JP] Japan .................................. 9-153437

[51] Int. Cl.$^6$ .................................................. B60H 1/00
[52] U.S. Cl. .......................................... 236/49.3; 236/13
[58] Field of Search .............................. 236/49.3, 13, 51, 236/91 R, 91 C, 91 D, 91 E, 91 F, 1 B, 1 EB; 165/202, 203, 204, 43, 42; 62/244; 454/75, 258

[56] References Cited

U.S. PATENT DOCUMENTS

| | | | |
|---|---|---|---|
| 4,697,734 | 10/1987 | Ueda | 236/13 |
| 4,834,283 | 5/1989 | Akabane et al. | 236/13 |
| 4,840,308 | 6/1989 | Akabane et al. | 165/43 X |
| 4,899,930 | 2/1990 | Kagohata et al. | 236/91 F |

*Primary Examiner*—Harry B. Tanner
*Attorney, Agent, or Firm*—Sughrue, Mion, Zinn, Macpeak & Seas, PLLC

[57] ABSTRACT

An air-conditioner amplifying means and a plural number of door actuators are connected by a single communication line, which transmits target stop-position data of the individual doors in accordance with predetermined locations. Target door opening-degree determining means determines whether the door is to be opened or closed depending on a positive or negative value of the temperature deviation, and judges a value of the temperature deviation in two or larger decision regions in determining the present door opening degree, wherein as temperature to which the decision region is applied for deciding the temperature deviation is large, a value of a fixed opening degree to be added to and subtracted from the preceding target door opening degree is larger.

3 Claims, 8 Drawing Sheets

MORE THAN 2 IN sec

FIG. 6 (b)

| UPPER bit | LOWER bit | WAVEFORM |
|---|---|---|
| SOM | | HLLL |
| 0 | 0 | HHH |
| 0 | 1 | HLH |
| 1 | 0 | HHL |
| 1 | 1 | HLL |

AIR-MIXING DOOR OPENING-DEGREE CONTROL DEVICE FOR AN AUTOMOTIVE VEHICLE AIR-CONDITIONING SYSTEM

BACKGROUND OF THE INVENTION

1. Field of the Invention The present invention relates to an air-mixing door opening-degree control device for an automotive vehicle air-conditioning system, in which an air-conditioner amplifying unit (master station) and a plurality of door actuators (slave stations) are connected by a single communication line and a single power source line to form a LAN (local area network), whereby to control an opening degree of an air mixing door.

2. Description of the Prior Art

A conventional door control device for an automotive vehicle air-conditioning system is disclosed in Japanese Patent Publication No. Hei. 6-8746, for example. In the disclosed device, actuator drive circuits for driving the respective door actuators are assembled into the air-conditioner amplifying unit, and an air mixing door actuator, a mode door actuator, and an intake door actuator are connected to the drive circuits by wiring harnesses.

In this door control device, five to nine harnesses are used to connect the drive circuits to the door actuators. This results in increase of the number of wiring harnesses and weights of the device. Different types of the actuators, such as a potentiometer system and an encoder system, are used. In this respect, it is difficult to obtain the merits of mass production. Further, the actuator drive circuits are assembled into the air-conditioner amplifying unit. This results in the increase of the amplifier size and a load to the microcomputer.

A possible approach to solving those problems is to connect the air-conditioner amplifying unit and the door actuators by a single communication line to form a LAN.

The approach, which uses the LAN, succeeds in reducing the number of wiring harnesses, integrating the actuators into a single unit, and reducing the size of the amplifier. Therefore, it has advantageous features, reduction of the system weight and system cost.

The following problems must be solved for using the LAN-basis system in place of the currently used system.

In the current system, as stated above, the door actuators are driven by the actuator drive circuits of the air-conditioner amplifying unit. Therefore, when a temperature control dial is operated, the air mixing door actuator to be operated through the dial operation is immediately driven without any response delay.

In the LAN-basis system, target stop position data is transmitted from the air-conditioner amplifying unit to the plural number of door actuators by way of one communication line. In this case, the transmission of the target stop position data is performed according to a predetermined rotation. When the temperature control dial is operated, the door actuator is driven with a time lag of one communication period in an extreme case. The time lag is large as the number of door actuators is larger.

Where LAN is applied to the connection of the air-conditioner amplifying unit and the door actuators, it is necessary to set a communication speed at a low speed in order to suppress radio noise. 100 msec. is taken for each door actuator. In the air-conditioning system including 10 door actuators, a total of 1 sec. is taken till communication to all the door actuators is completed. Therefore, after the temperature control dial is operated, a maximum of 1 sec. elapses till the air mixing door actuator operates.

Therefore, when a quantity to vary an opening degree of the air mixing door through one actuator operation is set at a fixed value (e.g., ±1%), if a large temperature difference exists, for example, by changing a set temperature, a time required for the opening degree of the air mixing door to reach the target door opening degree is long.

SUMMARY OF THE INVENTION

Accordingly, an object of the present invention is to provide an air-mixing door opening-degree control device for an automotive vehicle air-conditioning system which is capable of making an opening degree of the air mixing door quickly and exactly approach to the target door opening degree when a great temperature difference is caused owing to a change of a set temperature, while reducing the system weight and cost by constructing a network of the air-conditioner amplifying unit and the actuators with LAN.

Figure 1:
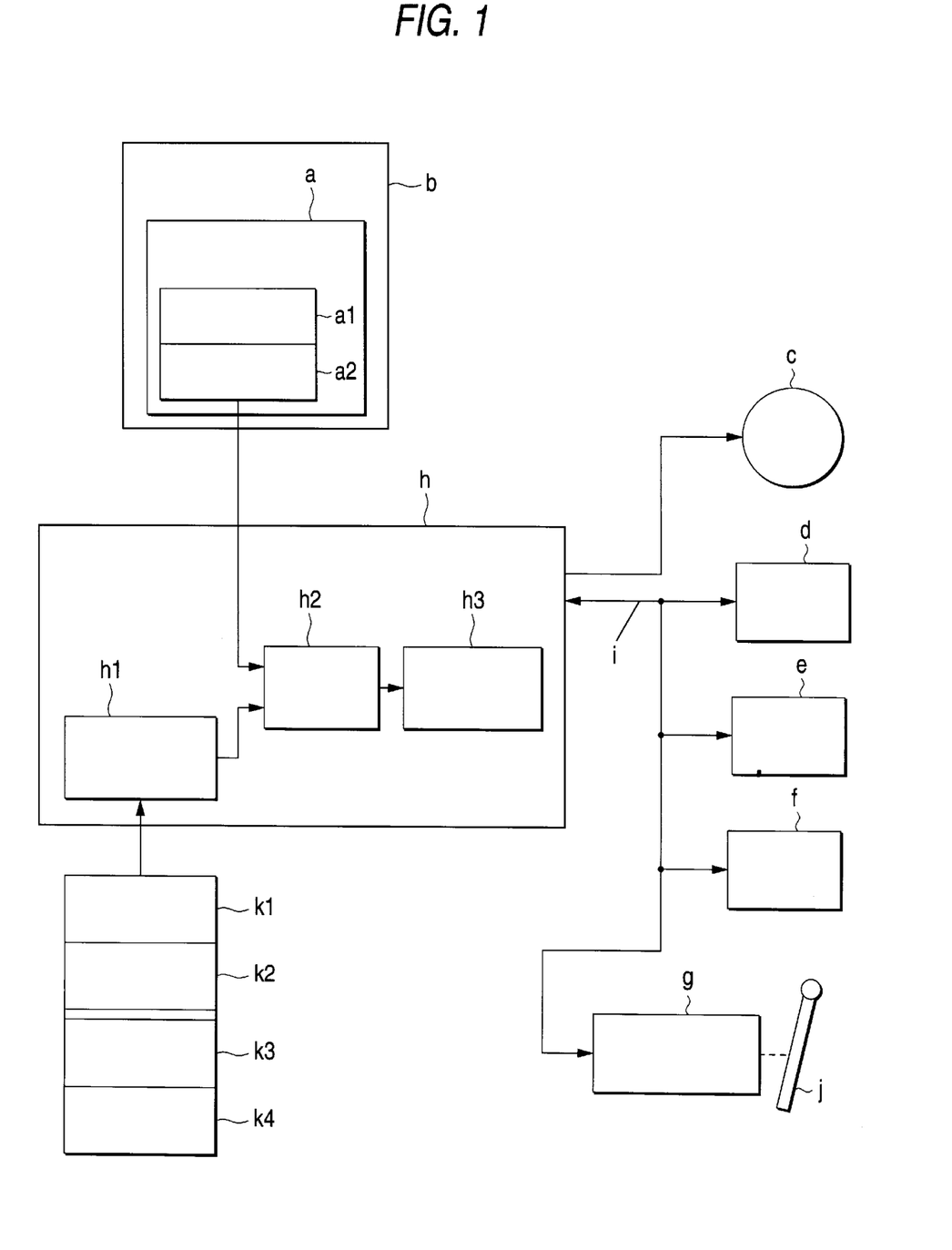
FIG. 1 is a conceptional block diagram showing a control device for controlling an opening-degree of an air-mixing door in an automotive vehicle air-conditioning system.

To solve the above problem, as shown in FIG. 1, the present invention sets forth an air-mixing door opening-degree control device for an automotive vehicle air-conditioning system having a controller b with an operation portion a including a mode select means a1, a temperature adjusting means a2 and the like, and an air-conditioner amplifying unit h for controlling the drive of a fan motor c and a plural number of door actuators d to e by processing input signals of the controller and various sensors in accordance with programs by a microprocessor contained therein, the air-mixing door opening-degree control device comprising: the air-conditioner amplifying unit h being interconnected with the plural number of door actuators d to g by a single communication line i for transmitting target stop position data for the respective doors in a predetermined rotation; the air-conditioner amplifying unit h including passenger-room air temperature predicting means k1, temperature deviation computing means k2, and target door opening-degree determining means k3, the passenger-room air temperature predicting means h1 for predicting an air temperature in a passenger room where a driver or passenger is present while considering temperature factors, the temperature deviation computing means h2 for computing a difference between a set temperature set by the temperature adjusting means a2 and a passenger-room air temperature predicted by the passenger-room air temperature predicting means h1, and the target door opening-degree determining means h3 for determining whether the door is to be opened or closed depending on a positive or negative value of the temperature deviation, for determining the present door opening degree by adding or subtracting a fixed opening degree to and from the preceding door opening degree, and for determining a value of the temperature deviation in two or larger decision regions, wherein as temperature to which the decision region is applied for deciding the temperature deviation is large, a value of a fixed opening degree to be added to and subtracted from the preceding target door opening degree is larger, wherein of the plural number of door actuators d to g, the air mixing door actuator g receives target stop position data corresponding to the target opening degree determined by the air-conditioner amplifying unit h, and operates and the air mixing door j so that an actual door opening degree detected is coincident with the target door opening degree.

As shown also in FIG. 1, for the same purpose, the aforementioned air-mixing door opening-degree control device is further specified such that the passenger-room air temperature predicting means h1 predicts an air temperature in a passenger room where a driver or passenger is present while considering outside air temperature derived from outside air sensing means k1, inside air temperature derived from inside air temperature sensing means k2, intake temperature derived from intake temperature sensing means k3, and a solar radiation quantity derived from solar radiation sensing means k4.

For the same purpose, the aforementioned air-mixing door opening-degree control device is further specified such that the temperature deviation computing means h2 computes a temperature deviation by using a thermal equilibrium formula containing a set temperature set by the temperature adjusting means a2, and the inside and output air temperature, intake temperature and solar radiation quantity, those being derived from the sensing means k1 to k4.

DETAILED DESCRIPTION OF THE PREFERRED EMBODIMENT

A construction of an embodiment according to the present invention, which is an air-mixing door opening-degree control device will be described with reference to the attached drawings.

Figure 2:
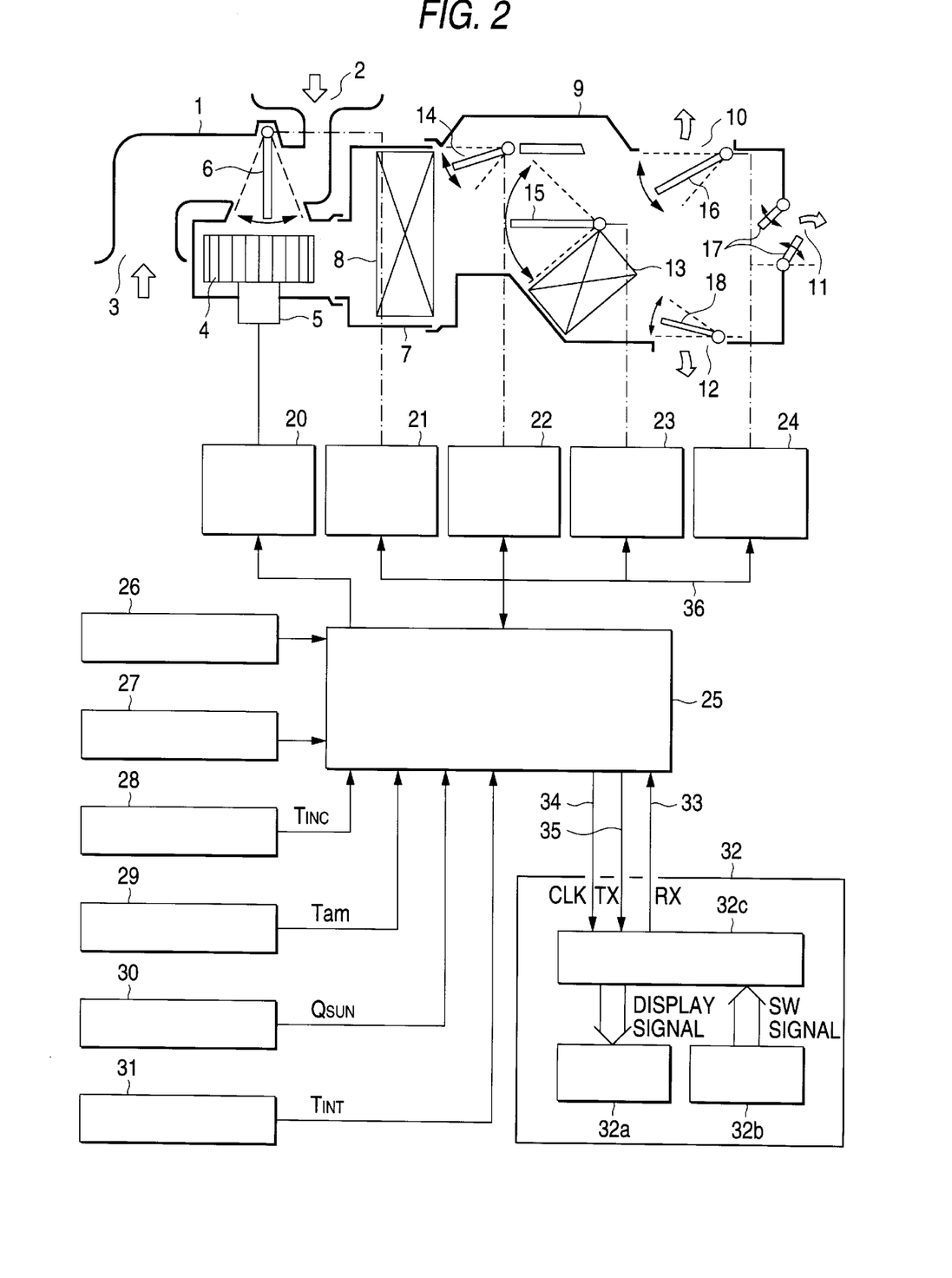
FIG. 2 is a block diagram showing an overall automotive vehicle air-conditioning system including the air-mixing door opening-degree control device according to an embodiment of the present invention.

FIG. 2 is a block diagram showing an automotive vehicle air-conditioning system which includes the air-mixing door opening-degree control device according to an embodiment of the present invention.

A mechanical system of the automotive vehicle air-conditioning system, as shown in the upper portion of FIG. 2, comprises an intake unit case 1, an outer air inlet 2, an inner side intake 3, a blower fan 4, a blower fan motor 5, an intake door 6, a cleaning unit case 7, an evaporator 8, a heater unit case 9, a vent outlet 10, a deflector outlet 11, a foot outlet 12, a heater core 13, a bypass door 14, an air mixing door 15, a vent door 16, a deflection door 17, and a foot door 18.

A control system of the automotive vehicle air-conditioning system is illustrated in the middle to lower portion of FIG. 2. The control system comprises a fan control circuit 20, an intake door actuator 21, a bypass door actuator (bi-level door), actuator 22, an air mixing door actuator 23, a mode door actuator 24, an air-conditioner amplifying unit 25, a water temperature sensor 26, a refrigerant temperature sensor 27, an inside air sensor 28 (inside air temperature detecting means), an outside air sensor 29 (outside air temperature sensing means), a solar radiation sensor 30 (solar radiation sensing means), an intake temperature sensor 31 (intake temperature sensing means), and a controller 32.

The fan control circuit 20 controls, in a stepless manner, a voltage applied to the blower fan motor 5 in response to a command from the air-conditioner amplifying unit 25.

When an opening degree (inside air, half-outside air, outside air) of the intake door 6 is determined by the air-conditioner amplifying unit 25, the intake door actuator 21 moves the intake door 6 till the determined opening degree is reached.

When a bi-level mode to keep the head cool and the feet warm is selected, the bypass door actuator (bi-level door) actuator 22 opens the bypass door 14 in response to a command from the air-conditioner amplifying unit 25.

Figure 3:
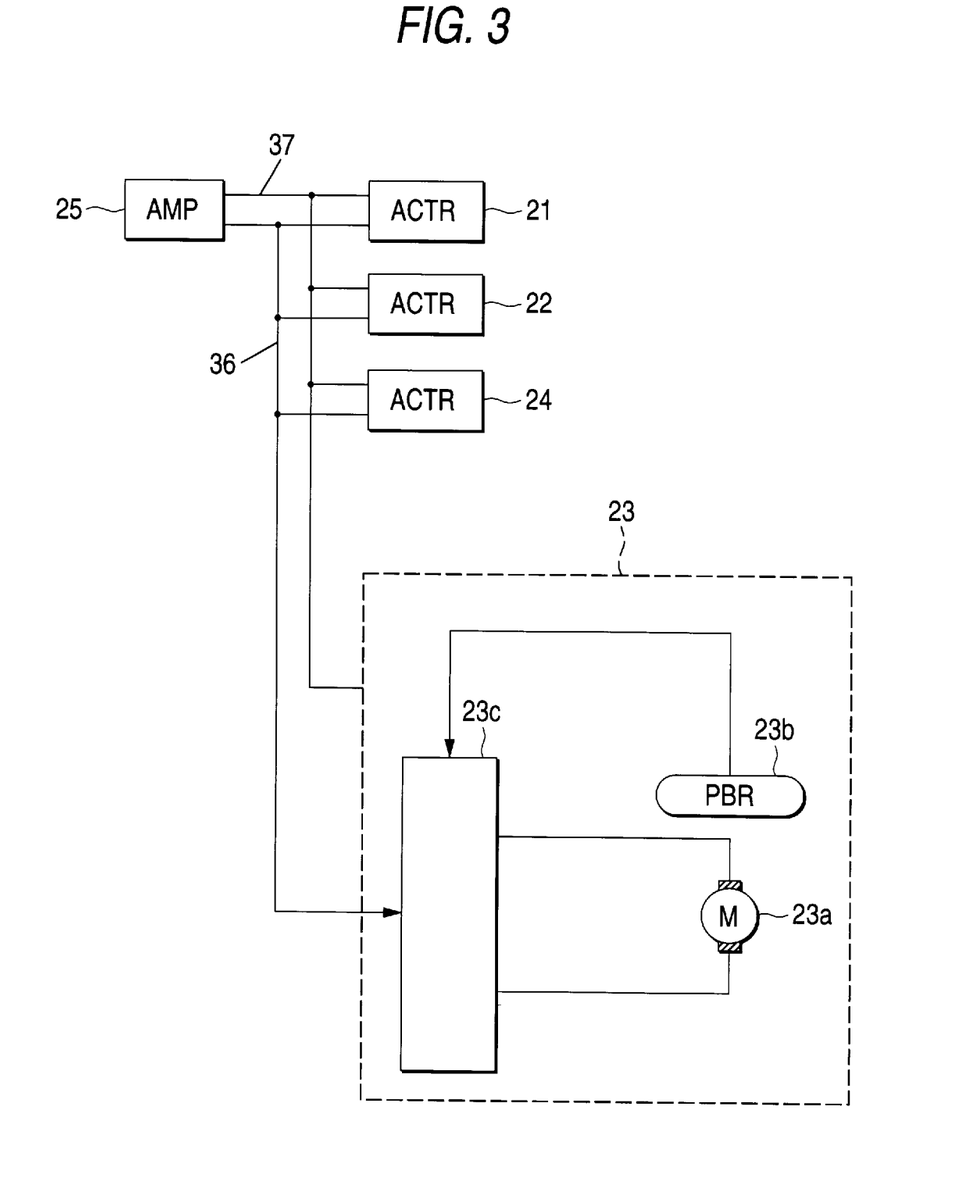
FIG. 3 is a block diagram showing a network connecting an amplifier and actuators in the embodiment.

When a target door opening degree XPBR is determined by the air-conditioner amplifying unit 25, the air mixing door actuator 23 receives target stop position data corresponding to the target opening degree XPBR, and operates the air mixing door 15 so as to obtain a door opening degree where an actual door opening degree PBR is coincident with the target door opening degree XPBR. As shown in FIG. 3, the air mixing door actuator 23 is made up of a door drive motor 23a, a door open-degree sensor 23b and a signal processing circuit 23c.

When a target mode door position is determined by the air-conditioner amplifying unit 25, the mode door actuator 24 drives a mode door (a general expression of the vent door 16, the deflection door 17 and the foot door 18).

The air-conditioner amplifying unit 25 computes input signals from controller 32 and various sensors in accordance with programs by a microprocessor contained therein, and synthetically controls the blower fan motor 5, and the door actuators 21 to 24, a compressor (not shown), and the like in accordance with the result of the computations.

The water temperature sensor 26 senses an engine cooling water temperature; the refrigerant temperature sensor 27 a refrigerant temperature; the inside air sensor 28 an inside air temperature TINC; the outside air sensor 29 an outside air temperature Tam; a solar radiation sensor 30 a solar radiation quantity QSUN; and the intake temperature sensor 31 an intake temperature TINT in terms of a resistance value or a current value, and outputs it to the air-conditioner amplifying unit 25.

The controller 32, assembled into a control panel in the passenger room, is made up of a display portion 32a to display a mode, fan speed, temperature and the like, an operation portion 32b including a mode switch (mode select means), a temperature control dial (temperature control means), and the like, and an operation/display/communication circuit 32c for outputting signals to the display portion 32a, receiving signals from the operation portion 32b, and transferring data to and from the air-conditioner amplifying unit 25. The operation/display/ communication circuit 32c and the air-conditioner amplifying unit 25 are connected by an operation data line 33, a clock signal line 34 and a display/communication data line 35.

FIG. 3 is a block diagram showing a network connecting an amplifier and actuators. As shown, the air-conditioner amplifying unit 25 is connected to the door actuators 21 to 24 by a single communication line 36 and a single power line 37. The air-conditioner amplifying unit 25 sends an address of each of the door actuators 21 to 24 and target position data of the motor, and an actuator specified by the address receives the data and turns the motor to a target position.

Figure 4:
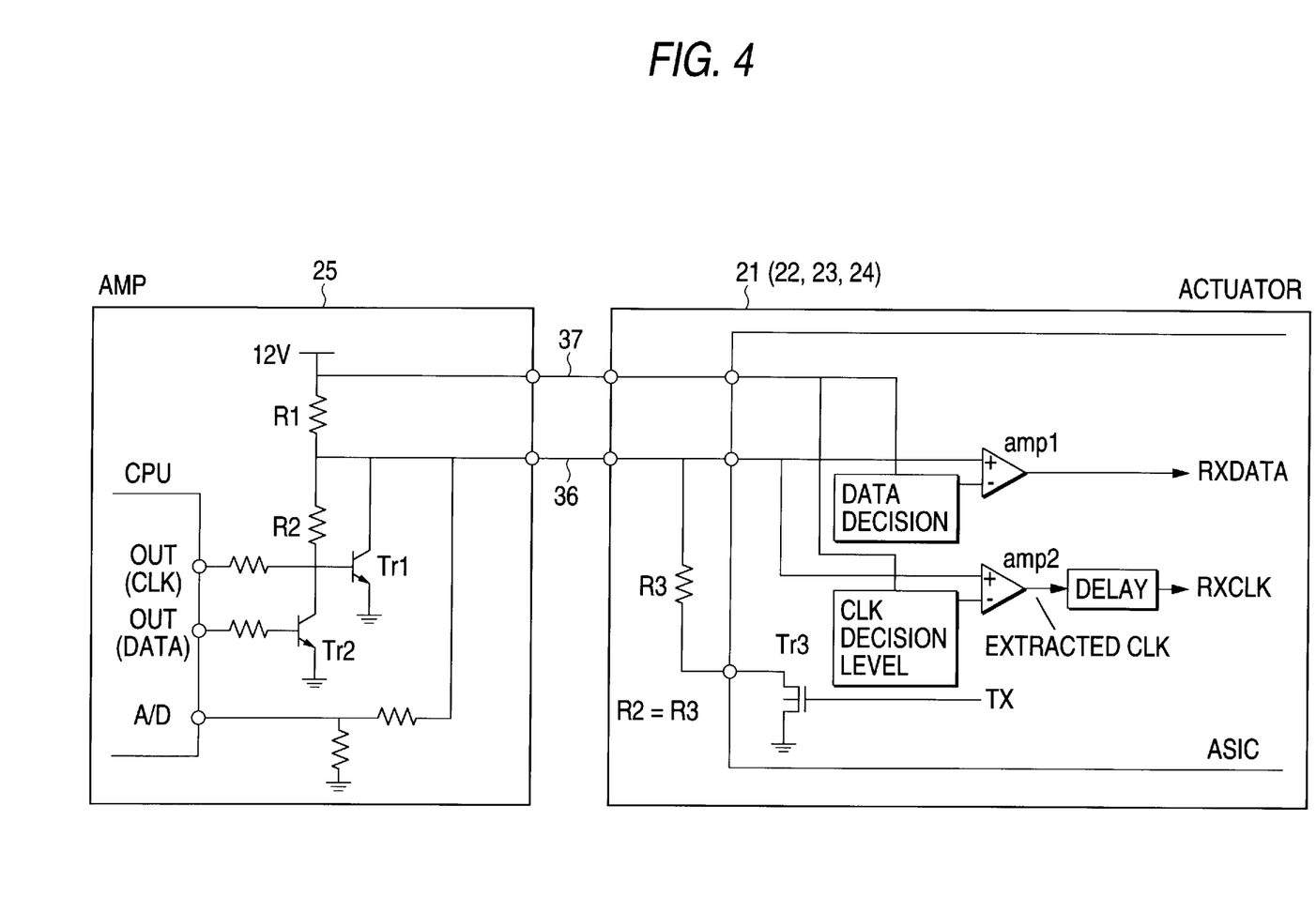
FIG. 4 is a circuit diagram showing a physical layer of the network in which a protecting circuit is omitted; otherwise it is connected between the amplifier and the actuators.

FIG. 4 is a circuit diagram showing a physical layer of the network (a layer having functions to set up, maintain and remove an electrical circuit connection in the network) in which a protecting circuit is omitted; otherwise it is connected between the amplifier and the actuators. For the digital transmission of this layer, two levels of pulse amplitudes H and L are expressed by using a three-level code in which data is superimposed on a clock signal for a communication signal. An ASIC (application specific integrated circuit) of each actuator extracts a clock signal from the communication signal, and a logic circuit of the ASIC decodes the communication signal (coded signals) by the extracted clock signal and performs all of other operations. The clock signal is supplied from only the air-conditioner amplifying unit. Therefore, a communication rate can be set at a desired value through a software installed in the air-conditioner amplifying unit.

Figure 5A:
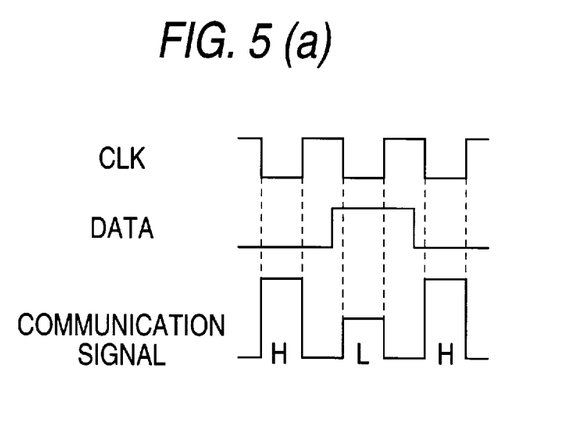
FIG. 5(a) is a timing chart showing a transmitting operation of the air-conditioner amplifying unit.

FIG. 5(a) is a timing chart showing a transmitting operation of the air-conditioner amplifying unit. When a CLK output signal (clock output signal) is in an H level, the communication line 36 is grounded by a transistor Tr1 irrespective of DATA output (data output) signal. When the CLK output signal is in an L level, the communication line 36 is set at 12V (Tr2 OFF) or a medium potential determined by resistors R1 and R2 (Tr2 ON) through an operation of a transistor Tr2 in response to DATA output.

Figure 5B:
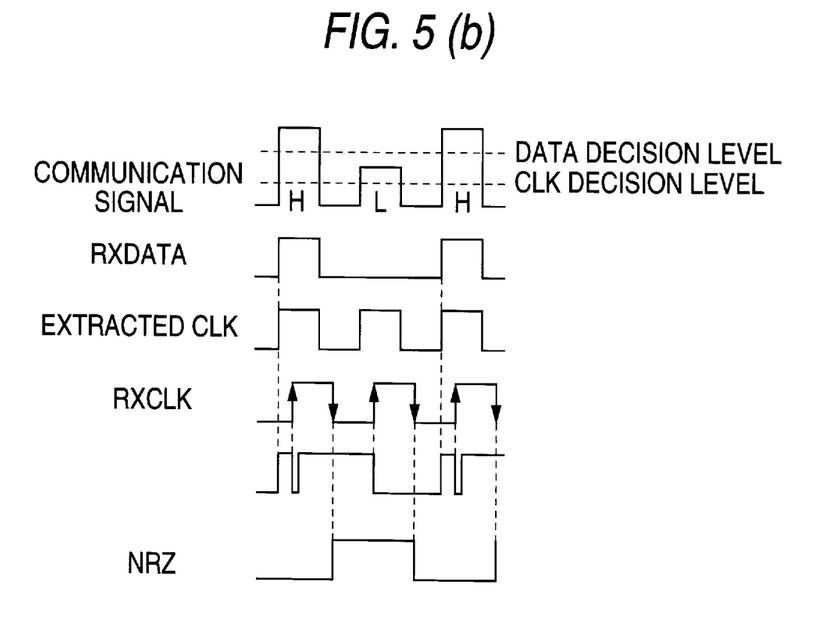
FIG. 5(b) is a timing chart showing a receiving operation of each actuator.

FIG. 5(b) is a timing chart showing a receiving operation of each actuator. In the figure, a data extracting comparator cmp1 has a decision level higher than an L pulse amplitude, and a clock extracting comparator cmp2 has a decision level lower than an L pulse amplitude. Data is decoded in a manner that a signal that is set by RXDATA and reset at the leading edge of RXCLK is sampled at the trailing edge of RXCLK. In the figure, NRZ is extracted data.

The operation of the air-mixing door opening-degree control device will be described.

[Communication procedure]

Figure 6:
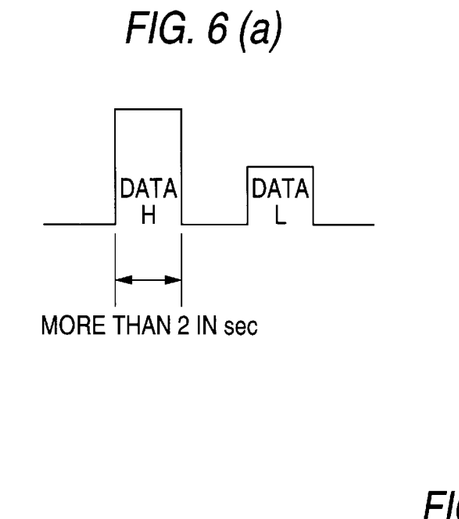
FIG. 6(a) is a diagram showing a communication waveform.
FIG. 6(b) is a diagram showing a coding table.
Figure 7:
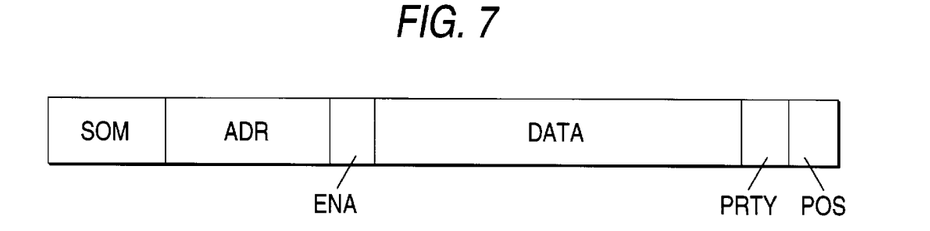
FIG. 7 is a diagram showing a communication format used for data communication.
Figure 8:
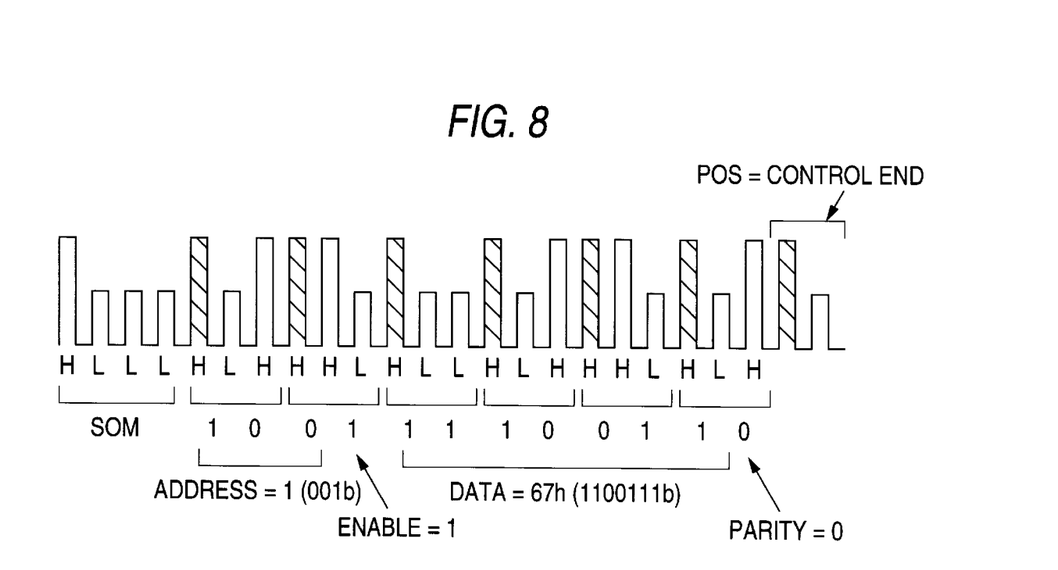
FIG. 8 is a diagram showing a specific example of the communication format.

As shown in FIG. 6(a), a signal used for communication is defined by signals of two level, H and L. As shown in an encoding table of FIG. 6(b), binary data of 2 bits is expressed by combination of three pluse, A communication format, as shown in FIG. 7, has an SOM (start of message) representing a transmission start, an ADR (address) representing an address of an actuator to which data is transmitted, an ENA (enable) representing permission or inhibition of motor drive, a DATA (data) representing a target door stop position, a PRTY (odd number parity) for checking ADR, ENA and DATA, and a POS (control end signal) representing a diagnosis actuator replay signal. A specific example of the communication format is shown in FIG. 8 in which shaded pulses are always H pulses.

A receiving sequence will be described. The ASIC starts a receiving sequence in response to a SOM representative of a communication start. Only when receiving an address assigned thereto, the ASIC reads the data following the address. When detecting a combination of the pulses not found in the encoding table or a parity error, the ASIC casts the received data. When receiving a SOM during the receiving sequence, the ASIC does the execution of the receiving sequence over again. The ASIC drives the motor only when the ENA is "1", but updates the data and does not drive the motor when it is "0".

Figure 9:
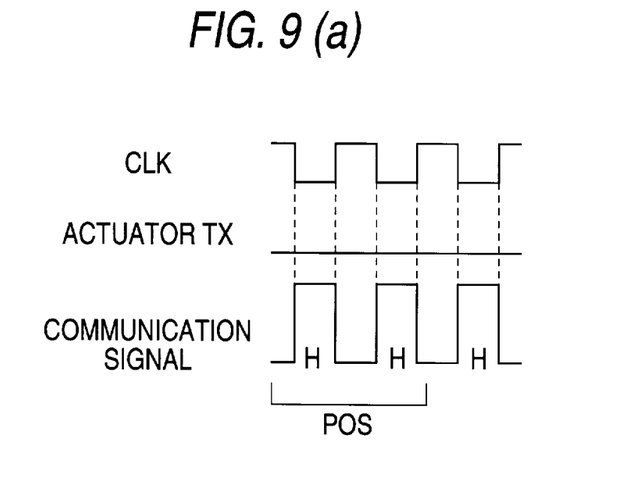
FIG. 9(a) shows a POS signal when the open degree control progresses.
FIG. 9(b) shows a POS signal when the control ends.

A replying operation of the actuator will be described. The air-conditioner amplifying unit necessarily turns off the transistor Tr2 in the portion of the POS signal, and usually two pulses representative of the POS signal are both put in an H level. When the actuator receives a signal from the air-conditioner amplifying unit, if the door position has reached a target position and the control has completed, the actuator turns on a transistor Tr3 at such a timing that the second pulse of the POS signal becomes an L pulse. The air-conditioner amplifying unit checks if the door of an actuator to which data is to be transmitted is at the target position by monitoring an amplitude of the POS signal. The actuator sends reply back to the air-conditioner amplifying unit only at the normal reception completion, and sends no reply to the amplifying unit when the address is incorrect or an error occurs. FIG. 9(a) shows a POS signal when the open degree control progresses, and FIG. 9(b) shows a POS signal when the control ends.

[Process of computing a door opening degree]

Figure 10:
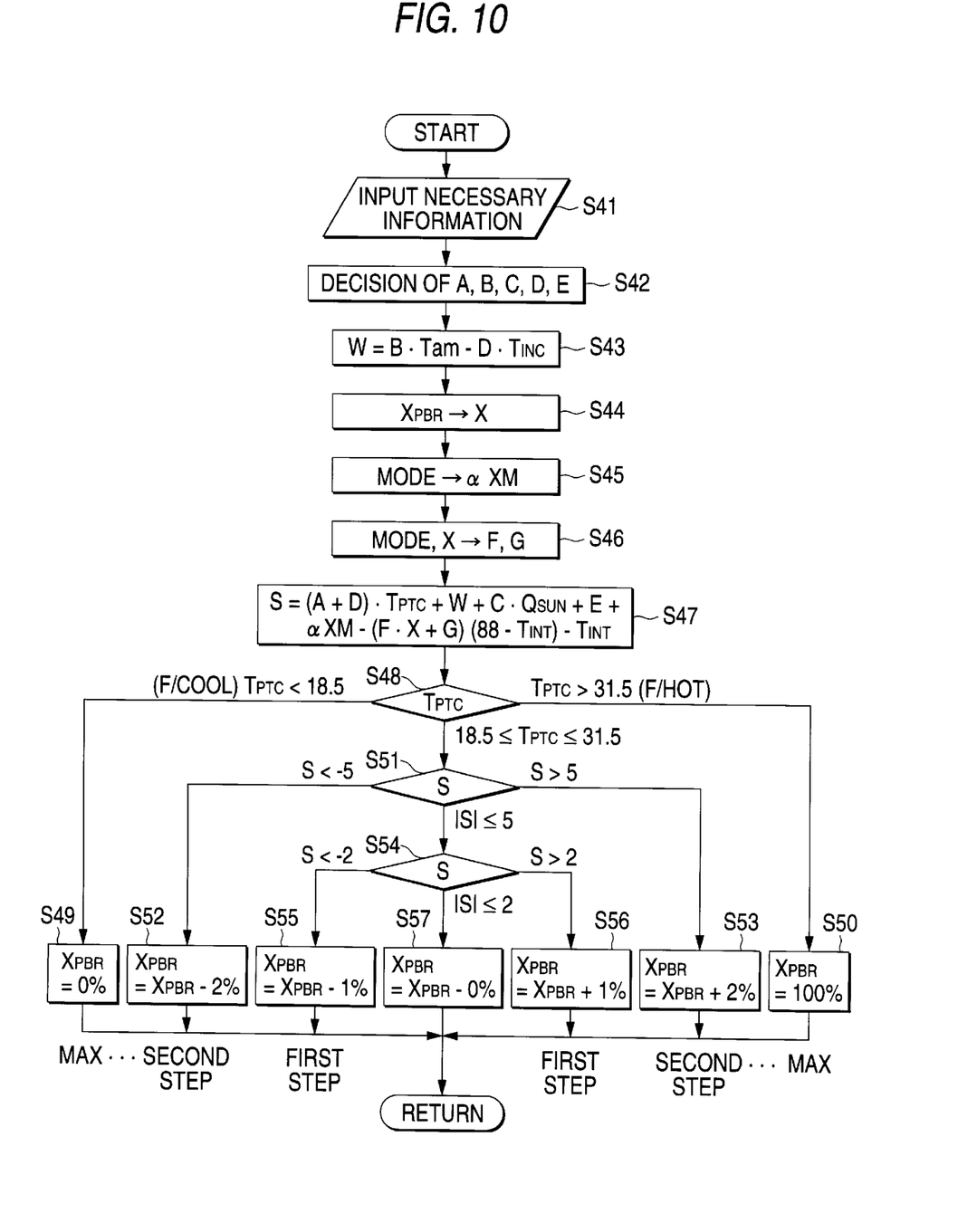
FIG. 10 is a flow chart showing a flow of a process for computing an opening degree of a target door, which is carried out in an air-conditioner amplifier unit in the air-mixing door opening-degree control device of the embodiment.

FIG. 10 is a flow chart showing a flow of a process for computing an opening degree XPBR of a target door, which is carried out in an air-conditioner amplifier unit 25 in the air-mixing door opening-degree control device. The computing process will be described step by step.

In a step 41, information necessary for controlling an opening degree of the air mixing door are input to the air-conditioner amplifying unit, from the sensors 26 to 31 and the controller 32.

In a step 42, coefficients A to E are determined which are used for a composite temperature formula and a thermal equilibrium formula, both being to be given later.

In a step 43, composite temperature W is computed by the following expression.

$$W = B \cdot Tam - D \cdot TINC$$

where

B and D: coefficient

Tam: outside air temperature

TINC: inside air temperature

In a step 44, the target door opening degree XPBR obtained in the preceding computing process is processed to produce a door opening degree X.

In a step 45, a difference correcting value $\alpha XM$ is determined for a selected mode (bi-level 1, bi-level 2, foot, deflection).

In a step 46, the coefficients F and G used for the thermal equilibrium formula are determined in accordance with the door opening degree X, and vent, deflection and bi-level 2 modes or other modes.

In a step 47, a temperature deviation S (which is used as an index of the temperature difference between the target temperature and the present temperature in the passenger room) is computed by the following thermal equilibrium formula (temperature deviation computing means).

$$S = (A+D) \cdot TPTC + WC + C \cdot QSUN + E + \alpha XM - (F \cdot X + G)(88 - TINT) - TINT$$

In the thermal equilibrium formula, the term of the composite temperature W defined by the outside air temperature Tam and the inside air temperature TINC, the term of the solar radiation quantity QSUN, and the term of the intake temperature TINT correspond to passenger-room air temperature predicting means.

A step 48 judges whether a set temperature TPTC is a full cool region (TPTC>18.5), a full hot region (TPTC>31.5), or a temperature adjustment region (18.5≦TPTC≦31.5).

If TPTC<18.5 (step 48), a step 49 sets the target door opening degree XPBR at 0% (XPBR=0%).

If TPTC >31.5 (step 48), a step 50 sets the target door opening degree XPBR at 100% (XPBR=100%).

If 18.5≦TPTC≦31.5 (step 48), a step 51 judges whether S<–5 or S>5 (S is computed in the step 47).

If S<–5 (step 51), a step 52 sets the target door opening degree XPBR at XPRB–2% (XPRB=XPRB–2%).

If S>5 (step 51), a step 53 sets the target door opening degree XPBR at XPRB+2% (XPRB=XPRB+2%).

If |S|≦5 (step 51), a step 54 judges whether S (temperature deviation)<–2 or>2.

If S<–2 (step 54), a step 55 sets the target door opening degree XPBR at XPBR–1% (XPBR=XPBR–1%).

If S>2 (step 54), a step 56 sets the target door opening degree XPBR at XPBR+1% (XPBR=XPBR+1%).

If |S|≦2 (step 54), a step 57 sets the target door opening degree XPBR at XPBR+0% (XPBR=XPBR+0%).

Those steps 48 to 57 correspond to target door opening-degree determining means.

[Control of an opening degree of the air mixing door]

A case will be given where during a drive, a set temperature TPTC is changed to a low temperature side by turning the temperature control dial in the operation portion 32*b* of the controller 32.

As a result of the change of the set temperature TPTC, a large temperature deviation S is produced in the initial stage. The computing process takes a processing flow of steps 41 to 48→step 51→52. The present target door opening degree XPBR is set at (preceding target door opening degree XPBR–2% opening degree). That is, the target door opening degree XPBR is far from the present door opening degree (preceding target door opening degree XPBR), and the door opening degree is repeatedly varied by 2% every control period so long as S<–5 (temperature deviation condition in the step 51) is satisfied. Accordingly, the air mixing door 15 is quickly turned in the closing direction by the air mixing door actuator 23.

Thereafter, With the closing of the air mixing door 15, the temperature deviation S becomes small. If S<–2 (temperature deviation condition in the step 54 is satisfied), the computing process takes a processing flow of steps 41 to 48→step 51→step 54→step 55. The present target door opening degree XPBR is set at (preceding target door opening degree XPBR–1% opening degree). That is, the target door opening degree XPBR approaches to the target door opening degree, and the door opening degree is repeatedly varied by 1% every control period so long as –5<S<–2 is satisfied. Accordingly, the air mixing door 15 is slowly turned in the closing direction by the air mixing door actuator 23.

Thus, when the target door opening degree XPBR is far from the present door opening degree (preceding target door opening degree XPBR), the air mixing door 15 is quickly turned in the closing direction. Therefore, a response time of the approach to the target opening degree is reduced. When the target door opening degree XPBR approaches to the target door opening degree, the air mixing door 15 is slowly turned in the closing direction. Accordingly, the air mixing door 15 stops at an exact position specified by the target opening degree.

The useful effects of the invention will be described.

(1) In determining the target door opening degree XPBR, two decision regions are used; a region of |S|>5 and a region |S|>2. If |S|>5 (S: determined temperature deviation), an opening degree value is set at 2%, which is added to or subtracted from the preceding target door opening degree XPBR. If |S|>2, an opening degree value is set at 1%, which is added to or subtracted from the preceding target door opening degree XPBR. Therefore, an air-mixing door opening-degree control device for an automotive vehicle air-conditioning system, which is provided by the present invention, is capable of making an opening degree of the air mixing door 15 quickly and exactly approach to the target door opening degree XPBR when a great temperature difference (temperature deviation) is caused owing to a change of a set temperature, while reducing the system weight and cost by constructing a network of the air-conditioner amplifying unit and the actuators with LAN.

(2) As seen from the thermal equilibrium formula, a passenger-room air temperature is predicted while taking an outside air temperature Tam, an inside air temperature TINC and an intake temperature TINT into consideration. Therefore, the passenger-room air temperature is highly accurately predicted.

(3) A temperature deviation S is computed using the thermal equilibrium formula. The computed temperature deviation S is accurate since vehicle ambient conditions and vehicle states are taken into consideration.

[Other embodiments]

In the aforementioned embodiment, two decision regions for deciding a value of a temperature deviation S are used. An opening degree value of 2% or 1% to be added to or subtracted from the preceding target door opening degree XPBR is selected depending on the decision region in which the temperature deviation S is decided. If required, more than two decision regions may be used. If so, the opening degree value to be added to or subtracted from the preceding target door opening degree XPBR is finer.

The aforementioned embodiment employs the means that predicts passenger-room air temperature while considering outside and inside air temperature, intake temperature and solar radiation quantity for the passenger-room air temperature predicting means for predicting an air temperature in a passenger room where a driver or passenger is present while considering temperature factors. If necessary, one or some of those temperature factors may be omitted or another or other temperature factor or factors may be added to those used in the embodiment.

For computing the temperature deviation S, the aforementioned embodiment uses the thermal equilibrium formula constructed using data gathered by an experiment. Another thermal equilibrium formula or a more simplified thermal equilibrium formula may be used for the same purpose.

What is claimed is:

1. An air-mixing door opening-degree control device for an automotive vehicle air-conditioning system, comprising:
   a plurality of door actuators operating a plurality of doors so that the doors open at a target door opening degree; and
   an air-conditioner amplifying unit for processing input signals from outer equipments provided in the automotive vehicle in accordance with programs contained therein so as to control said door actuators;
   wherein said air-conditioner amplifying unit is interconnected with said door actuators by a single communication line for transmitting target stop position data for said doors in a predetermined rotation, and said air-conditioner amplifying unit comprises:
  (i) passenger-room air temperature predicting means for predicting an air temperature in a passenger room while considering temperature factors;
  (ii) temperature deviation computing means for computing a temperature deviation between a set temperature set by an outer temperature adjusting means provided in the outer equipment and a passenger-room air temperature predicted by said passenger-room air temperature predicting means; and
  (iii) target door opening-degree determining means for determining whether the door is to be opened or closed corresponding to a positive or negative value of the temperature deviation, for determining a present door opening degree by adding or subtracting a fixed opening degree to and from a preceding door opening degree, and for determining a value of the temperature deviation using two or more decision regions, wherein as temperature which is applied to the decision region for deciding the temperature deviation is larger, a value of a fixed opening degree to be added to and subtracted from the preceding target door opening degree is larger; and wherein an air mixing door actuator among said plurality of door actuators receives the target stop position data corresponding to the target door opening degree and operates said air mixing door so that an actual door opening degree detected is coincident with the target door opening degree.

2. The air-mixing door opening-degree control device according to claim 1, wherein outside air temperature sensing means for sensing outside air temperature, inside air temperature sensing means for sensing inside air temperature, intake temperature sensing means for sensing intake temperature and solar radiation sensing means for sensing a solar radiation quantity are provided in the automotive vehicle air-conditioning system, and said passenger-room air temperature predicting means predicts the air temperature in a passenger room while considering the outside air temperature, the inside air temperature, the intake temperature and the solar radiation quantity.

3. The air-mixing door opening-degree control device according to claim 2, wherein said temperature deviation computing means computes the temperature deviation by using a thermal equilibrium formula containing a set temperature set by the temperature adjusting means, the outside air temperature, inside air temperature, intake temperature and solar radiation quantity.

* * * * *